UNITED STATES PATENT OFFICE.

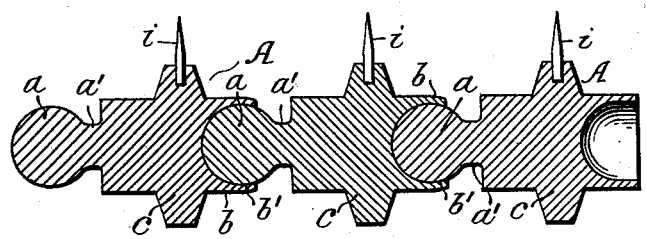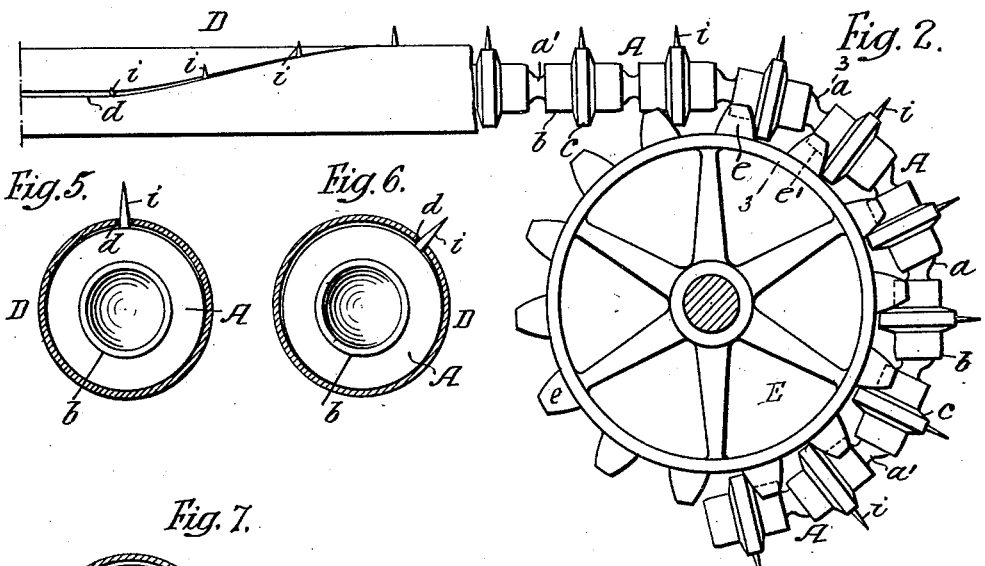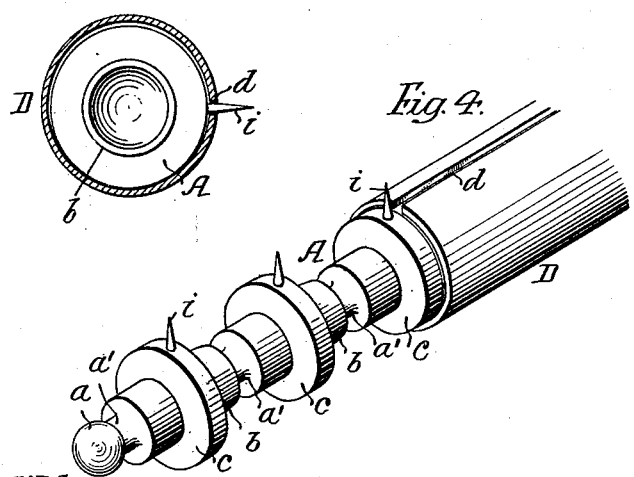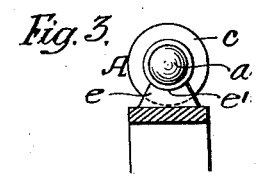

ARTHUR BURGESS, JOHN G. REHFUSS, AND MARTIN O. REHFUSS, OF PHILADELPHIA, PENNSYLVANIA.

CONVEYER.

1,085,538.

Specification of Letters Patent.

Patented Jan. 27, 1914.

Application filed April 20, 1911, Serial No. 622,361. Renewed July 3, 1913. Serial No. 777,339.

*To all whom it may concern:*

Be it known that we, ARTHUR BURGESS, a subject of the King of Great Britain and Ireland and the Isle of Man, and JOHN G. REHFUSS and MARTIN O. REHFUSS, citizens of the United States, all residing in Philadelphia, county of Philadelphia, State of Pennsylvania, have invented certain Improvements in Conveyers, of which the following is a specification.

Our invention relates to certain improvements in conveyers, particularly those used for feeding or conveying materials, such as fabrics, to a folding or other machine.

One object of the invention is to construct the chain so that the links will be universally connected; one link being free to turn independently of the other.

A further object of the invention is to provide a link with a projecting flange, which may be used as the driving flange, and also to provide pins, or other projections, on the flange for engaging the fabric, or other goods, to be conveyed.

In the accompanying drawings:—Figure 1, is a longitudinal sectional view of our improved chain; Fig. 2, is a view showing our improved chain passing around a sprocket wheel and through a tube; Fig. 3, is a sectional view on the line 3—3, Fig. 2; Fig. 4, is a perspective view illustrating the chain and guide tube, and Figs. 5, 6 and 7, are sectional views showing the chain in different positions in the guide tube.

A are the links of the chain. Each link has at one end a ball $a$ and at the opposite end a socket $b$, in which is mounted the ball of an adjoining link. The balls are connected to the body of the link by necks $a'$ and, in the present instance, the flange $b'$ of each socket portion is crimped over the end of the ball so as to firmly connect the links together, but there is sufficient space to permit of lateral movement of the ball in the socket; the ball being free to turn in the socket so that there is a universal joint connecting each link of the chain. On each link is an annular flange $c$. This flange can be of any width desired and not only acts as a guide for the chain within the tube D, but also acts as the drive flange for the chain.

The sprocket wheel E has teeth $e$ between which rest flanges $c$ of the links of the chain and the end $e'$ of each tooth is preferably curved to conform to the shape of the body portion of the link. The guide tube D has a longitudinal slot $d$ therein and mounted on the flanges $c$ of the links, in the present instance, are pins $i$, which project through the slot, as clearly shown in Figs. 2 and 5. The pins are guided by the walls of the slot and if the slot is spiral, as in Fig. 2, then the pins will travel in the spiral slot and will turn its links, as illustrated in Figs. 6 and 7; the universal joints connecting the links permitting of this movement.

The invention is particularly adapted for use in feeding and guiding fabrics, which are engaged by the projecting pins and when the guiding tube, with the curved slot is used, as shown in Fig. 2 of the drawings, the chain not only feeds the fabric forward, but, at a certain point, automatically releases the fabric. In other instances it may be used to stretch the fabric during an interval of its travel, while mechanism is operating on the fabric.

One use to which the invention may be applied, is as a feeding medium employed in connection with means for folding fabrics, such as lace curtains, but it will be understood that the invention can be used as a means for stretching fabrics, or may be used for other purposes.

The contour of the body of the link and of the flange, as well as the form of pin, may be modified without departing from the essential features of the invention.

We claim:

1. The combination in a conveyer chain, of a series of links; ball and socket connections between the links; each link having a driving flange; a pin projecting from the driving flange; and guides for the pin.

2. The combination of a chain made of a series of links connected by ball and socket joints so as to allow one link to turn freely of the others; pins on the links; and curved guides for turning the links as the chain is traversed.

3. The combination of a chain having a series of links connected by ball and socket joints; a flange on each link of the chain; a pin projecting from each flange; a guiding tube through which the chain travels; said tube having a curved slot therein; the pins on the links projecting through the slot so that as the chain is traversed through the tube, the links will be turned.

In testimony whereof, we have signed our names to this specification, in the presence of two subscribing witnesses.

ARTHUR BURGESS.
JOHN G. REHFUSS.
MARTIN O. REHFUSS.

Witnesses:
W<small>M</small>. E. S<small>HUPE</small>,
W<small>M</small>. A. B<small>ARR</small>.

Copies of this patent may be obtained for five cents each, by addressing the "Commissioner of Patents, Washington, D. C."